US012533942B2

(12) United States Patent
Rahm et al.

(10) Patent No.: US 12,533,942 B2
(45) Date of Patent: Jan. 27, 2026

(54) DRIVE TRAIN ARRANGEMENT FOR PROVIDING PRESSURIZED GAS

(71) Applicant: VOLVO TRUCK CORPORATION, Gothenburg (SE)

(72) Inventors: Fredrik Rahm, Hörby (SE); Johan Carlén Andersson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/781,412

(22) Filed: Jul. 23, 2024

(65) Prior Publication Data

US 2025/0065705 A1     Feb. 27, 2025

(30) Foreign Application Priority Data

Aug. 22, 2023    (EP) .................................... 23192555

(51) Int. Cl.
*B60K 6/12*     (2006.01)
*B60T 17/02*     (2006.01)

(52) U.S. Cl.
CPC ................ *B60K 6/12* (2013.01); *B60T 17/02* (2013.01); *B60K 2006/123* (2013.01)

(58) Field of Classification Search
CPC ..... B60K 6/12; B60K 2006/123; B60T 17/02; B60T 17/06; F02D 41/0065; F02D 41/0077; F02M 26/10; F02M 26/34; F02M 26/37; F02M 26/52; F02B 21/00
See application file for complete search history.

(56) References Cited

U.S. PATENT DOCUMENTS

| | | | | |
|---|---|---|---|---|
| 3,914,944 A | * | 10/1975 | Schmidt | F02B 37/00 60/599 |
| 4,375,748 A | * | 3/1983 | Yamane | F02B 37/12 123/378 |
| 6,376,927 B1 | * | 4/2002 | Tamai | B60K 6/383 290/31 |
| 2003/0154716 A1 | * | 8/2003 | Redon | F02M 26/37 60/605.2 |

(Continued)

FOREIGN PATENT DOCUMENTS

EP     3839224 A1     6/2021

OTHER PUBLICATIONS

Extended European Search Report in corresponding European Application No. 23192555.3 Dated Feb. 12, 2024 (7 pages).

*Primary Examiner* — Loren C Edwards
(74) *Attorney, Agent, or Firm* — Jeffri A. Kaminski; Venable LLP

(57) ABSTRACT

A drive train arrangement includes an internal combustion engine with at least one cylinder having a combustion gas inlet, and an exhaust outlet; an exhaust gas pump having a pump inlet coupled to the exhaust outlet, and a pump outlet coupled to a vehicle air tank and to the combustion gas inlet. A first flow control arrangement controls fluid flow from the pump outlet to the combustion gas inlet, and to the vehicle air tank. Control circuitry controls operation of the first flow control arrangement. The control circuitry is configured to: acquire a first indication of an air pressure in the vehicle air tank; and control, in response to the air pressure in the vehicle air tank being below a first threshold, the first flow control arrangement to allow fluid flow from the pump outlet to the vehicle air tank.

12 Claims, 5 Drawing Sheets

(56) References Cited

U.S. PATENT DOCUMENTS

2005/0166592 A1 8/2005 Larson et al.
2020/0156643 A1 5/2020 Hu et al.
2021/0332744 A1* 10/2021 Moine .................... F02B 21/00

* cited by examiner

DRIVE TRAIN ARRANGEMENT FOR PROVIDING PRESSURIZED GAS

TECHNICAL FIELD

The disclosure relates generally to a drive train arrangement for a vehicle. In particular aspects, the disclosure relates to a drive train arrangement for providing pressurized air. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Various vehicles, in particular various heavy duty vehicles, use pressurized air for the operation of sub-systems, such as the braking system. The pressurized air is generally stored in one or more air tanks, and the pressure in the air tanks is maintained by a dedicated vehicle air compressor arrangement. It would be desirable to provide for improved production of pressurized air in a vehicle, in particular providing reduced complexity and/or improved efficiency.

SUMMARY

According to a first aspect of the disclosure, it is provided a drive train arrangement for a heavy duty vehicle, comprising: an internal combustion engine with at least one cylinder having a combustion gas inlet for receiving combustion gas, and an exhaust outlet for output of pressurized exhaust gas from the cylinder; an exhaust gas pump having a pump inlet coupled to the exhaust outlet of the cylinder of the internal combustion engine, and a pump outlet coupled to a vehicle air tank and to the air inlet of the cylinder of the internal combustion engine; a second first flow control arrangement arranged to control fluid flow from the pump outlet of the exhaust gas pump to the combustion gas inlet of the cylinder of the internal combustion engine, and to the vehicle air tank; and control circuitry arranged and configured to control operation of the first and second flow control arrangements, wherein the control circuitry is configured to: acquire a first indication indicative of an air pressure in the vehicle air tank; and control, in response to the first indication indicating that the air pressure in the vehicle air tank is below a predefined first threshold pressure, the first flow control arrangement to allow fluid flow from the exhaust outlet of the cylinder of the internal combustion engine to the pump inlet of the exhaust gas pump, and the second first flow control arrangement to allow fluid flow from the pump outlet of the exhaust gas pump to the vehicle air tank. The first aspect of the disclosure may seek to reduce a complexity of a drive train arrangement that is configured to compress air for use in one or more vehicle sub-systems, such as an air brake system. A technical benefit may include to allow dual use of the exhaust gas pump, sometimes also referred to as exhaust gas recirculation pump or EGR pump. In particular, the present disclosure enables use of the exhaust gas pump for selectively (i) providing exhaust gas to the combustion gas inlet of the at least one cylinder of the internal combustion engine (ICE), and (ii) further compressing air that has first been compressed in the at least one cylinder of the ICE and providing the thus two-stage compressed air to a vehicle air tank. Through the additional compression by the exhaust gas pump, the pressure needed for, for example, an air brake system of a heavy duty vehicle can be provided. Furthermore, this can be achieved substantially without additional components, as the exhaust gas pump additionally fulfills the function of recirculating exhaust gas to the combustion gas inlet, in order to reduce emission from the ICE.

In some examples, including in at least one preferred example, optionally the control circuitry may be configured to control, in response to the first indication indicating that the air pressure in the vehicle air tank is below the first predefined threshold pressure, the first flow control arrangement to prevent fluid flow from the pump outlet of the exhaust gas pump to the combustion gas inlet of the cylinder of the internal combustion engine. A technical benefit may include to provide for fully selective operation in EGR-mode and air generation mode, respectively.

In some examples, including in at least one preferred example, optionally the control circuitry may be configured to control, in response to the first indication indicating that the air pressure in the vehicle air tank is below the first predefined threshold pressure, the exhaust gas pump to provide a pressure differential between the pump outlet and the pump inlet. A technical benefit may include to allow compression of the vehicle air to a pressure that may be considerably higher than the maximum allowable pressure at the exhaust outlet of the at least one cylinder of the ICE.

In some examples, including in at least one preferred example, optionally the control circuitry may be configured to control the exhaust gas pump to operate until the pressure differential between the pump outlet and the pump inlet is increased by at least 3 bar.

In some examples, including in at least one preferred example, optionally the control circuitry may be configured to acquire a second indication indicative of a pressure in a fluid conduit between the exhaust outlet of the cylinder of the internal combustion engine and the pump inlet; and control, in response to the second indication indicating that the pressure in the fluid conduit is higher than a second predefined threshold pressure, the exhaust gas pump to increase a gas flow rate through the exhaust gas pump. A technical benefit may include to allow efficient compression of air, where the at least one cylinder of the ICE is used to compress the air up to the second threshold pressure, and the exhaust gas pump is used to further compress the air up to the pressure required by the vehicle air system. The second threshold pressure may be indicative of a maximum allowable pressure at the exhaust outlet, such as in an exhaust manifold. By increasing the gas flow rate through the exhaust gas pump, the pressure at the exhaust outlet can be maintained at or below the second threshold pressure, and the pressure to the vehicle air tank can be further increased as desired.

In some examples, including in at least one preferred example, optionally the drive train arrangement may comprise a second flow control arrangement arranged to control fluid flow from the exhaust outlet of the cylinder of the internal combustion engine to an exhaust after treatment system of the internal combustion engine; and the control circuitry may be configured to: acquire a second indication indicative of a pressure in a fluid conduit between the exhaust outlet of the cylinder of the internal combustion engine and the pump inlet; and control, in response to the second indication indicating that the pressure in the fluid conduit is higher than a predefined second threshold pressure, the second flow control arrangement to increase a gas flow from the exhaust outlet of the cylinder of the internal combustion engine to an exhaust after treatment system of the internal combustion engine. A technical benefit may include to allow efficient compression of air, where the at least one cylinder of the ICE is used to compress the air up to the second threshold pressure, and the exhaust gas pump is used to further compress the air up to the pressure required by the vehicle air system. The second threshold pressure may be indicative of a maximum allowable pressure at the exhaust outlet, such as in an exhaust manifold. By allowing and/or increasing gas flow from the exhaust outlet of the at least one cylinder of the ICE to an exhaust after treatment system (EATS) of the ICE, the pressure at the exhaust outlet can be maintained at or below the second threshold pressure, and the pressure to the vehicle air tank can be further increased as desired. This may be an alternative or complement to increasing the operation of the exhaust gas pump as described above.

In some examples, including in at least one preferred example, optionally the drive train arrangement may comprise a second flow control arrangement arranged to control fluid flow from the exhaust outlet of the cylinder of the internal combustion engine to an exhaust after treatment system of the internal combustion engine; and the control circuitry may be configured to acquire a second indication indicative of a pressure in a fluid conduit between the exhaust outlet of the cylinder of the internal combustion engine and the pump inlet; and control, in response to the second indication indicating that the pressure in the fluid conduit is lower than a predefined fourth threshold pressure, the second flow control arrangement to reduce a gas flow from the exhaust outlet of the cylinder of the internal combustion engine to an exhaust after treatment system of the internal combustion engine. A technical benefit may include to provide for the pressure at the exhaust outlet of the at least one cylinder being sufficiently high for efficient compression of air by the exhaust gas pump. For instance, the second flow control arrangement may be controlled to reduce the gas flow to such an extent, possibly in combination with controlling the operation of the internal combustion engine, that the pressure at the exhaust outlet and/or in an exhaust manifold, if applicable, is kept higher than the above-mentioned fourth threshold pressure. For instance, it may be beneficial to keep the pressure at the exhaust outlet/at the pump inlet higher than, say 4-5 bar. This may reduce the requirements on the pressure increase to be provided by the exhaust gas pump, which may in turn provide for improved efficiency of the provision of the vehicle air.

In some examples, including in at least one preferred example, optionally the drive train arrangement may comprise a cooling arrangement between the exhaust outlet of the cylinder of the internal combustion engine and the pump inlet. A technical benefit may include to provide for more efficient compression of air without adding to the complexity of the drive train arrangement. When the drive train arrangement operates in the EGR-mode, the cooling arrangement may be used for providing more efficient operation of the ICE, and in the air compression mode, the cooling arrangement may provide for more efficient provision of compressed air to the vehicle air tank. Furthermore, provision of this cooling arrangement may allow the use of a vehicle air system without, or at least with considerably reduced additional separate cooling. This provides for a reduction in the complexity of the vehicle air system and for a reduction in the space required and in the cost of the vehicle air system.

In some examples, including in at least one preferred example, optionally the 5 control circuitry may be configured to control the internal combustion engine to an air pumping mode in which fuel supply to the cylinder is prevented. A technical benefit may include that the ICE may provide efficient compression, and since fuel supply to the at least one cylinder is prevented, the compressed gas at the exhaust outlet will be clean air, so that no further filtering is required. Pumping by the ICE is an energy-efficient way of producing compressed air, at least up to the above-mentioned second threshold pressure. The controlling of the ICE to its air pumping mode may take place in response to the first indication indicating that the air pressure in the vehicle air tank is below the first threshold pressure. It should be noted that so-called "fired pumping" may be used, in combination with a filter for filtering the exhaust gases before provision to the vehicle air tank.

In some examples, including in at least one preferred example, optionally the drive train arrangement may comprise an electric motor controllable to rotate a crankshaft of the internal combustion engine; and the control circuitry may be configured to control the electric motor to rotate the crankshaft of the internal combustion engine in the air pumping mode. A technical benefit may include that the ICE may be operated in the air pumping mode at any time, as long as there is sufficient stored electrical energy to operate the electric motor. Alternatively, or in combination, the ICE in air pumping mode may be operated/driven in other ways, such as by the inertia of the vehicle. Wheels of a drive axle of the vehicle may be allowed to rotate the ICE in air pumping mode, to thereby provide pressurized air while retarding the vehicle. Another option, that may be used as an alternative or complement, may be to operate a portion of the ICE in combustion mode and another portion of the ICE in air pumping mode. For example, at least one cylinder may be controlled to operate in combustion mode through supply of fuel and suitable control of valves, and at least one other cylinder may be controlled to operate in air pumping mode through prevention of fuel supply and suitable control of valves.

The drive train arrangement according to various examples or combinations of examples may advantageously be included in a vehicle, further comprising vehicle wheels, where the drive train arrangement is arranged to drive at least one of the vehicle wheels.

In some examples, including in at least one preferred example, optionally the vehicle may comprise the vehicle air tank coupled to the pump outlet of the exhaust gas pump; and an air brake system coupled to the vehicle air tank and to at least one of the vehicle wheels, the air brake system being operable using compressed air from the vehicle air tank.

According to a second aspect of the disclosure, there is provided a method of providing pressurized air to a vehicle air tank of a heavy duty vehicle including an internal combustion engine with at least one cylinder having a combustion gas inlet for receiving combustion gas, and an exhaust outlet for output of pressurized exhaust gas from the cylinder, and an exhaust gas pump having a pump inlet coupled to the exhaust outlet of the cylinder of the internal combustion engine, and a pump outlet coupled to a vehicle air tank and to the air inlet of the cylinder of the internal combustion engine, the method comprising: acquiring a first indication indicative of an air pressure in the vehicle air tank; and controlling, in response to the first indication indicating that the air pressure in the vehicle air tank is below a predefined first threshold pressure, a first flow control arrangement to allow fluid flow from an exhaust outlet of a cylinder of an internal combustion engine of the vehicle to a pump inlet of an exhaust gas pump, and a second flow control arrangement to allow fluid flow from the a pump outlet of the exhaust gas pump to the vehicle air tank. The second aspect of the disclosure may seek to reduce a complexity of a drive train arrangement that is configured to compress air for use in one or more vehicle sub-systems, such as an air brake system. A technical benefit may include to allow dual use of the exhaust gas pump, sometimes also referred to as exhaust gas recirculation pump or EGR pump. In particular, the present disclosure enables use of the exhaust gas pump for selectively (i) providing exhaust gas to the combustion gas inlet of the at least one cylinder of the internal combustion engine (ICE), and (ii) further compressing air that has first been compressed in the at least one cylinder of the ICE and providing the thus two-stage compressed air to a vehicle air tank. Through the additional compression by the exhaust gas pump, the pressure needed for, for example, an air brake system of a heavy duty vehicle can be provided. Furthermore, this can be achieved substantially without additional components, as the exhaust gas pump additionally fulfills the function of recirculating exhaust gas to the combustion gas inlet, in order to reduce emission from the ICE, in normal firing mode.

In some examples, including in at least one preferred example, optionally the method may comprise controlling, in response to the first indication indicating that the air pressure in the vehicle air tank is below the first threshold pressure, the exhaust gas pump to provide a pressure differential between the pump outlet and the pump inlet.

In some examples, including in at least one preferred example, optionally the method may comprise controlling, in response to the first indication indicating that the air pressure in the vehicle air tank is below the first threshold pressure, the exhaust gas pump to provide a pressure differential between the pump outlet and the pump inlet.

In some examples, including in at least one preferred example, optionally the method may comprise cooling gas output through the exhaust gas outlet of the cylinder upstream of the pump inlet of the exhaust gas pump.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
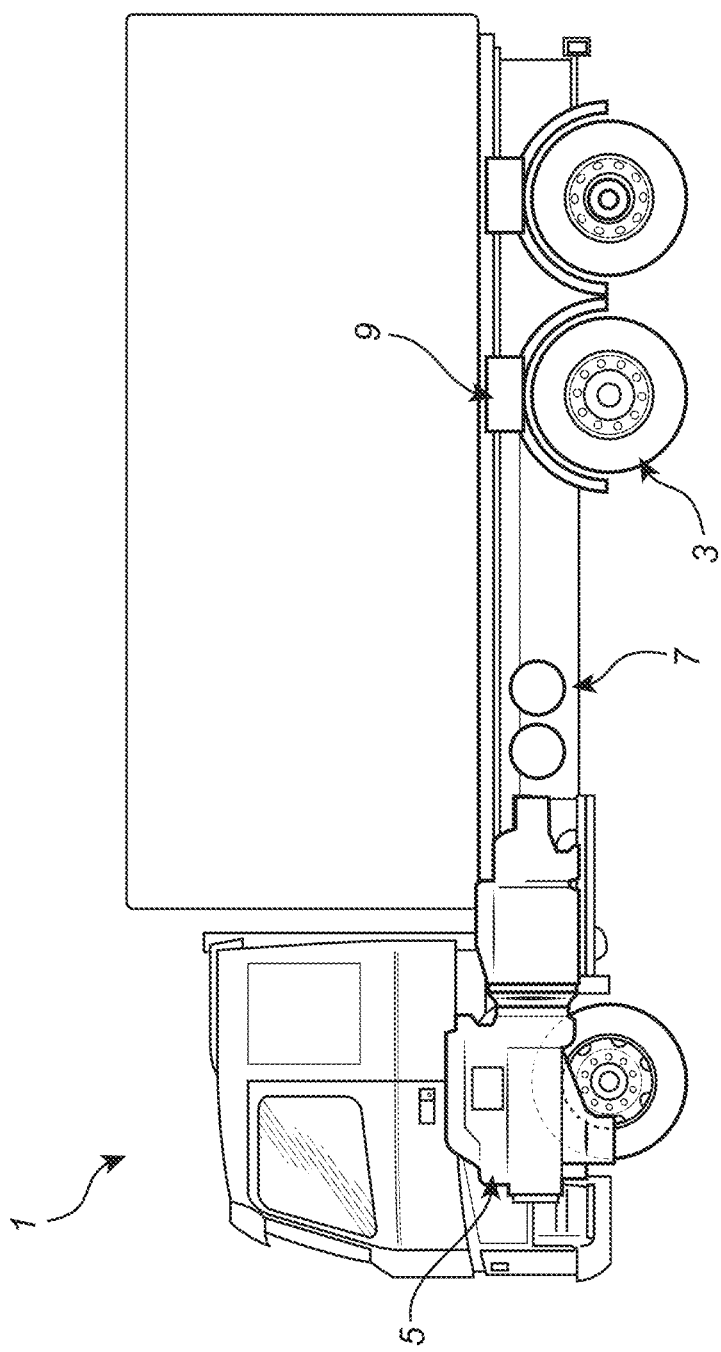
FIG. 1 is an exemplary vehicle according to an example.

FIG. 1 is an exemplary vehicle 1 according to an example. Referring to FIG. 1, the exemplary vehicle 1 comprises vehicle wheels 3, a drive train arrangement 5, a vehicle air tank 7, and an air brake system 9.

Figure 2:
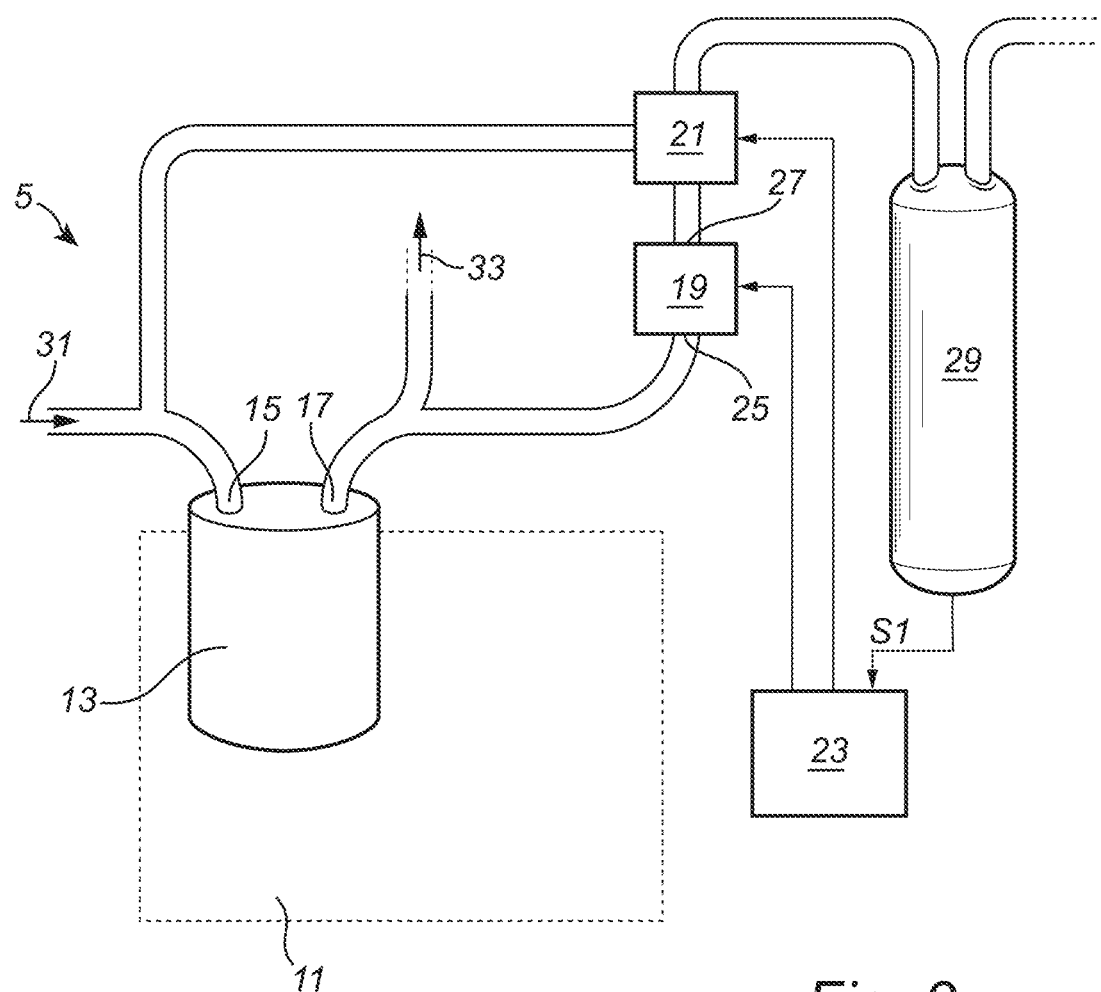
FIG. 2 is an exemplary drive train arrangement according to an example.

FIG. 2 is an exemplary drive train arrangement 5 according to an example. Referring to FIG. 2, the exemplary drive train arrangement 5 comprises an internal combustion engine (ICE) 11 with at least one cylinder 13 having a combustion gas inlet 15 and an exhaust outlet 17. The drive train arrangement 5 further comprises an exhaust gas pump 19, a first flow control arrangement 21, and control circuitry 23. The exhaust gas pump 19 has a pump inlet 25 and a pump outlet 27. The pump inlet 25 is coupled to the exhaust outlet 17 of the cylinder 13 and the pump outlet 27 is coupled to a vehicle air tank 29, which is not part of the drive train arrangement 5, and to the combustion gas inlet 15 of the cylinder 13. The first flow control arrangement 21 is arranged to control fluid flow from the pump outlet 27 of the exhaust gas pump 19 to the combustion gas inlet 15 of the cylinder 13, and to control fluid flow from the pump outlet 27 of the exhaust gas pump 19 to the vehicle air tank 29. The first flow control arrangement may, for example, be a controllable three-way valve.

During operation of the drive train arrangement 5, the ICE 11 may be operational to drive the vehicle 1 and/or to power any sub-systems of the vehicle 1. Fuel will then be injected in the at least one cylinder 13 of the ICE 11, where the fuel will be mixed with combustion gas received through the combustion gas inlet 15. The combustion gas, which is typically air, originates from an air intake of the vehicle, as is schematically indicated by the arrow 31 in FIG. 2. As a result of repeated combustions, the ICE 11 will operate as is per se well known in the art, and pressurized exhaust gas will be output through the exhaust outlet 17. Normally, the exhaust gas will be routed towards the exhaust after treatment system (EATS) of the vehicle 1, as is schematically indicated by the arrow 33 in FIG. 2. To improve operation and/or reduce emission from the vehicle 1, exhaust gas may be provided to the combustion gas inlet 15. In the example configuration of FIG. 2, the control circuitry 23 may then control the exhaust gas pump 19 to operate, and control the flow control arrangement 21 to allow flow of exhaust gas from the pump outlet 27 of the exhaust gas pump 19 to the combustion gas inlet 15 of the at least one cylinder 13. Furthermore, the control circuitry 23 may be configured to acquire a first indication S1 indicative of an air pressure in the vehicle air tank 29, and to control, in response to the first indication S1 indicating that the air pressure in the vehicle air tank 29 is below a predefined first threshold pressure, the first flow control arrangement 21 to allow fluid flow from the pump outlet 27 to the vehicle air tank 29.

Figure 3:
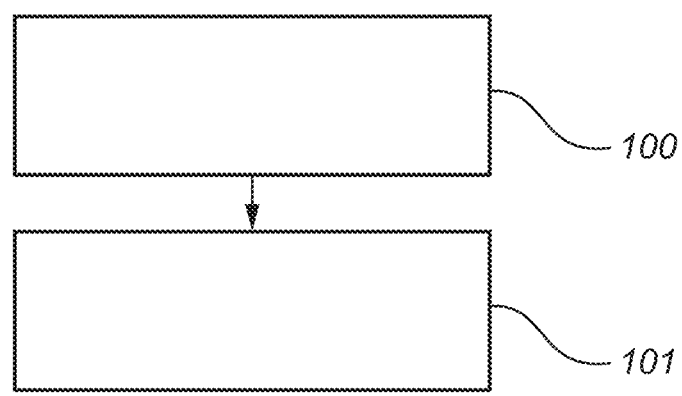
FIG. 3 is an exemplary method according to an example.

FIG. 3 is an exemplary method of providing pressurized air to a vehicle air tank 29 of a heavy duty vehicle 1 including an internal combustion engine 11 with at least one cylinder 13 having a combustion gas inlet 15 for receiving combustion gas, and an exhaust outlet 17 for output of pressurized exhaust gas from the cylinder 13, and an exhaust gas pump 19 having a pump inlet 25 coupled to the exhaust outlet 17 of the cylinder 13 of the internal combustion engine 11, and a pump outlet 27 coupled to the vehicle air tank 29 and to the air inlet 15 of the cylinder 13 of the internal combustion engine 11. The method comprises acquiring 100 a first indication S1 indicative of an air pressure in the vehicle air tank 29; and controlling 101, in response to the first indication S1 indicating that the air pressure in the vehicle air tank 29 is below a predefined first threshold pressure, a first flow control arrangement 21 to allow fluid flow from the pump outlet 27 of the exhaust gas pump 19 to the vehicle air tank 29.

The drive train arrangement 5 and method according to examples of the present disclosure provide several advantages over existing solutions for providing pressurized vehicle air. The ICE 11 and the exhaust gas pump 19 co-operate to increase the pressure of air to the high pressure required for important vehicle subsystems, such as air brakes 9. Moreover, this is achieved in an energy-efficient manner, and substantially without additional hardware. The exhaust gas pump 19 may advantageously be a displacement pump, which is suitable both for EGR-operation and for the pressure boost functionality when providing vehicle air at a pressure in the vehicle tank 29 that may be in excess of 5 bar, such as at least 8 bar, or at least 10 bar. Such high pressures cannot generally be provided directly from the exhaust outlet 17 of the at least one cylinder 13 of the ICE 11, due to limitations related to fluid conduits and/or valves etc. For instance, the exhaust outlet 17 of each cylinder 13 in a plurality of cylinders may be fluid connected to an exhaust manifold (not shown in FIG. 2), where a maximum pressure may be allowed, which may be less than the pressure required in the vehicle tank 29.

Figure 4:
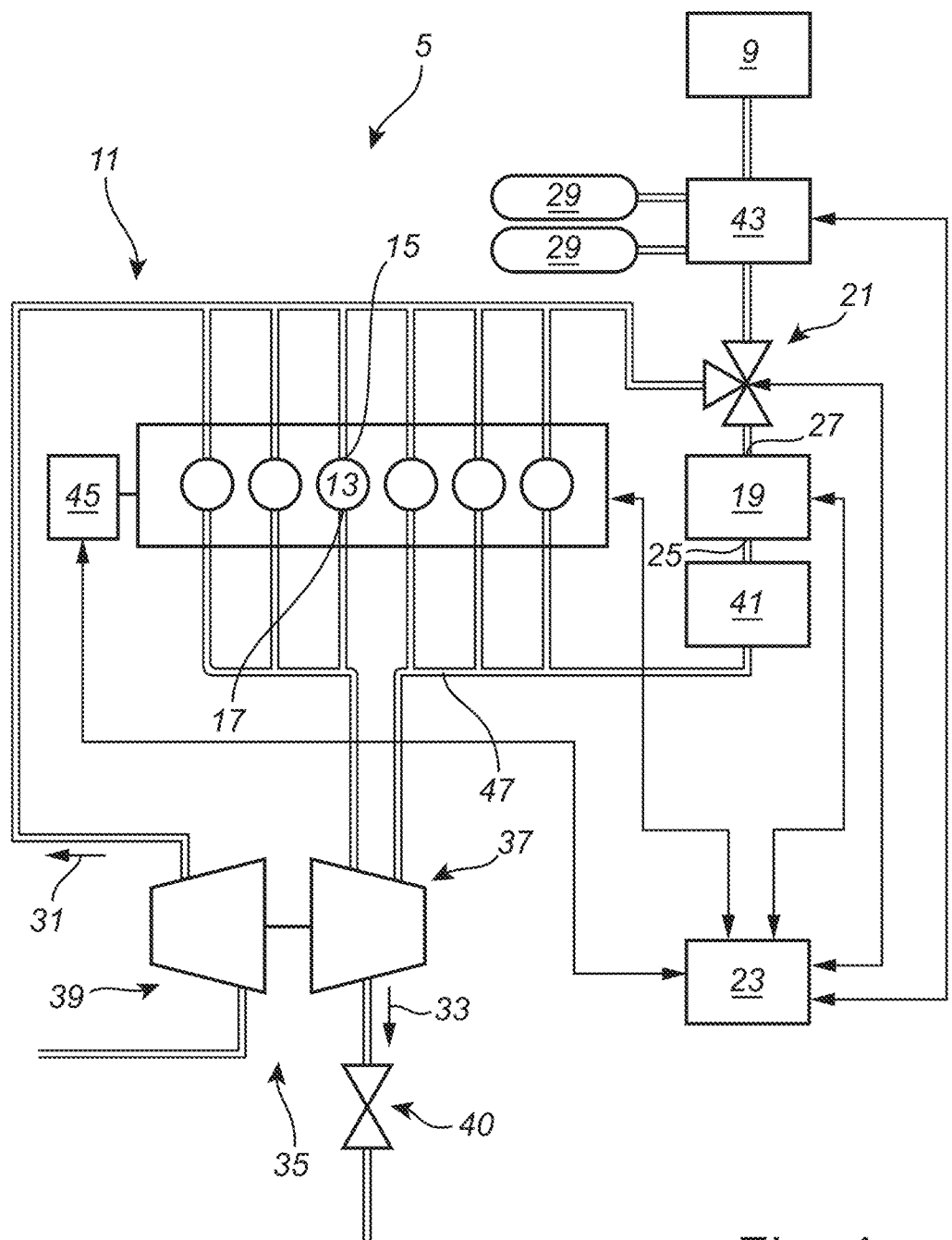
FIG. 4 is an exemplary drive train arrangement according to an example.

FIG. 4 is an exemplary drive train arrangement 5 according to an example. In this exemplary drive train arrangement 5, various parts are included which are not absolutely necessary for operating the drive train arrangement 5 for providing pressurized vehicle air, but which may provide various advantages. It should be noted that it is also not necessary to implement all of these various parts together, but that selected ones of the parts may be chosen to be implemented depending on the requirements of a particular application.

Referring to FIG. 4, the exemplary drive train arrangement 5 comprises an internal combustion engine (ICE) 11 with six cylinders 13 (only one of these is denoted by a reference numeral to avoid cluttering the drawings), each having a combustion gas inlet 15 and an exhaust outlet 17. As was described above with reference to FIG. 2, the drive train arrangement 5 further comprises an exhaust gas pump 19, a first flow control arrangement 21, and control circuitry 23. The exhaust gas pump 19 has a pump inlet 25 and a pump outlet 27. The pump inlet 25 is coupled to the exhaust outlets 17 of the cylinders 13 and the pump outlet 27 is coupled to a vehicle air tanks 29, which are not part of the drive train arrangement 5, and to the combustion gas inlets 15 of the cylinders 13. The first flow control arrangement 21 is arranged to control fluid flow from the pump outlet 27 of the exhaust gas pump 19 to the combustion gas inlets 15 of the cylinders 13, and to control fluid flow from the pump outlet 27 of the exhaust gas pump 19 to the vehicle air tanks 29. The first flow control arrangement may, for example, be a controllable three-way valve, as is schematically indicated in FIG. 4.

In addition to what was described above with reference to the more conceptual drive train arrangement 5 in FIG. 2, the exemplary drive train arrangement 5 in FIG. 4 comprises a turbo arrangement 35 with a turbine 37 and a compressor 39, an exhaust valve 40, a cooling arrangement 41 between the exhaust outlets 17 of the cylinders 13 and the pump inlet 25, an air pressure management unit 43, and an electric motor 45. The exhaust valve 40 is an example of a second flow control arrangement arranged to control fluid flow from the exhaust outlet 17 of the cylinder 13 of the internal combustion engine 11 to an exhaust after treatment system (not shown in FIG. 4) of the internal combustion engine 11.

Exemplary operation of the exemplary drive train arrangement 5 in FIG. 4 will now be described with reference to the flow-chart in FIG. 5. A first indication S1 is acquired 200 by the control circuitry 23. The first indication S1 is indicative of an air pressure in the vehicle air tanks 29. The first indication S1, which may be provided from the air pressure management unit 43 may, for example, be in the form of an electronic signal or message. The air pressure $P_{AT}$ (any measure indicative of the air pressure) in the vehicle air tanks 29 is compared 201 with a corresponding measure indicative of a predefined first threshold pressure $P_{TH1}$. The first threshold pressure $P_{TH1}$ may have been selected as the pressure at which the vehicle air tanks 29 (or one of the vehicle air tanks 29) should be provided with air in order to maintain a sufficient pressure for safe operation of various vehicle sub-systems, such as the air brake system 9 schematically indicated in FIG. 4.

If it is determined that the pressure $P_{AT}$ in the air tanks 29 is higher than the first threshold pressure $P_{TH1}$, then the method continues to acquire the first indication S1. The acquisition may for example be periodic, or may be provided from the air pressure management unit 43 in the form of an interrupt. In that case, the first indication S1 may possibly only be provided by the air pressure management unit 43 when the pressure $P_{AT}$ in the air tanks 29 is below the first threshold pressure $P_{TH1}$. In that case, the determining step 201 may be performed by the air pressure management unit 43.

If it is determined that the pressure $P_{AT}$ in the air tanks 29 is below the first threshold pressure $P_{TH1}$, then the control circuitry 23 controls 202 the ICE 11 to pump mode, optionally controls 203 the electric motor 45 to operate, controls 204 the first flow control arrangement 21 to allow fluid flow from the pump outlet 27 of the exhaust gas pump 19 to the vehicle air tanks 29, and controls 205 the exhaust gas pump 19 to operate. It should be understood that these actions may be initiated substantially simultaneously, or in one of several suitable sequences, as will be apparent to one of ordinary skill in the art. Furthermore, it will be known to the skilled person how to control the ICE 11 to pump mode, and that this can be achieved in various ways. For instance, fuel supply to one or more cylinders 13 may be prevented and valve timing may be adapted to the pump mode. As a result, the pressurized air will be output through the exhaust outlet 17 of one or more of the cylinders 13. When the ICE 11 is in the pump mode—partly or completely—the cylinder or cylinders 13 that are pumping air cannot contribute to driving the pumping by the ICE 11. To that end, the driving wheels 3 of the vehicle 1 may by allowed to rotate the ICE 11. Alternatively, or in combination, the electric machine 45 may be operated to rotate the ICE 11, in embodiments of the drive train arrangement 5 comprising an electric machine arranged and controllable to rotate the ICE 11. Another possibility known to one of ordinary skill in the art would be to control a first set of cylinders to operate in the pump mode and a second set of cylinders to operation in combustion mode, so that the second set of cylinders can be operable to rotate the ICE 11 and thereby drive the pumping of the cylinders in the first set. The exhaust gas pump 19 may be operated to transport air towards the vehicle air tanks 29 from the time of receipt of a first indication S1 indicating that the air tank pressure $P_{AT}$ is lower than the first threshold pressure $P_{TH1}$, or the exhaust gas pump 19 may be started in response to a determination that the pressure in the vehicle air tanks 29 has risen to a predefined higher pressure, or the exhaust gas pump 19 may be started in response to a determination that the pressure at the exhaust outlet 17 of the one or more cylinders 13 has reached a predetermined second threshold pressure $P_{TH2}$. In the present exemplary method, the exhaust pump 19 has been started before the pressure at the exhaust outlet 17 (such as in the exhaust manifold 47 has reached the second threshold pressure $P_{TH2}$.

Figure 5:
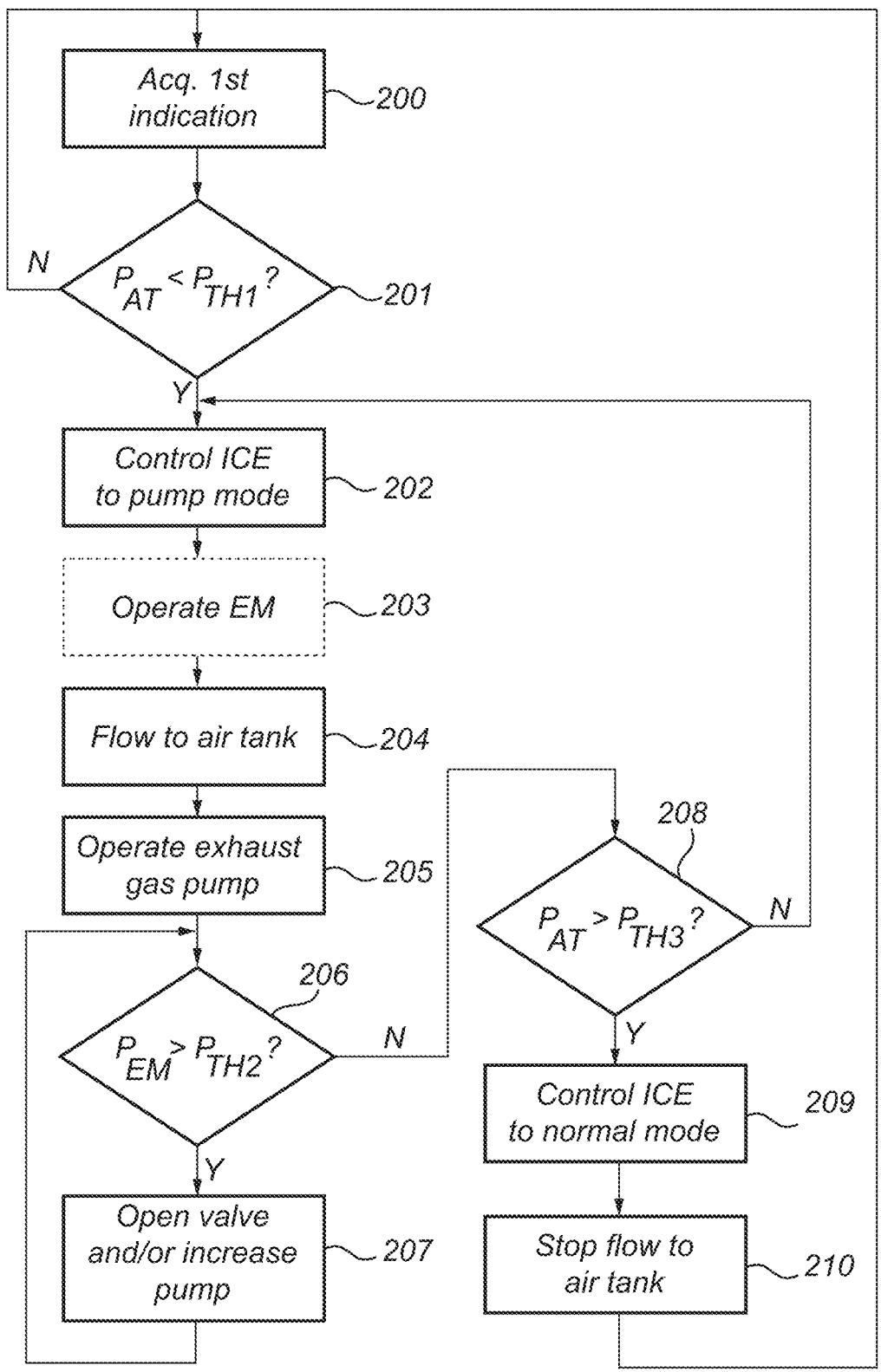
FIG. 5 is an exemplary method according to an example.

Thus, according to the exemplary method illustrated by the flow-chart in FIG. 5, it is determined 206 if the pressure $P_{EM}$ in the exhaust manifold 47 is higher than the second threshold pressure $P_{TH2}$, which may be related to a pressure limit for safe operation of the ICE 11. If it is determined that the pressure $P_{EM}$ in the exhaust manifold 47 has reached the second threshold pressure $P_{TH2}$, the pressure $P_{EM}$ in the exhaust manifold 47 is reduced or limited by at least partly opening the exhaust valve 40 and/or controlling the exhaust gas pump 19 to increase the transport of air by the exhaust gas pump 19 from the pump inlet 25 to the pump outlet 27, and on to the vehicle tanks 29, in step 207. The exhaust valve 40 is indicated in FIG. 4 as being downstream the turbine 37. It should be noted that the exhaust valve 40 may alternatively be upstream the turbine 37, between the exhaust outlet 17 and the turbine 37. Alternatively, there may be one exhaust valve upstream the turbine 37 and one exhaust valve downstream the turbine 37.

While thus maintaining the pressure $P_{EM}$ in the exhaust manifold 47 at or below the second threshold pressure $P_{TH2}$, the method proceeds to evaluate 208 the pressure $P_{AT}$ in the air tanks 29 with respect to a predetermined third threshold pressure $P_{TH3}$, indicating that the provision of pressurized air to the vehicle tanks 29 can be stopped. If the third threshold pressure $P_{TH3}$ has not been reached, the provision of pressurized air may proceed, as indicated by the 'N'-option at step 208. If the third threshold pressure $P_{TH3}$ has been reached, the method may proceed to control 209, by the control circuitry 23, the ICE 11 to normal mode, and control 210 the flow control device 21 to stop the flow to the air tanks 29.

Figure 6:
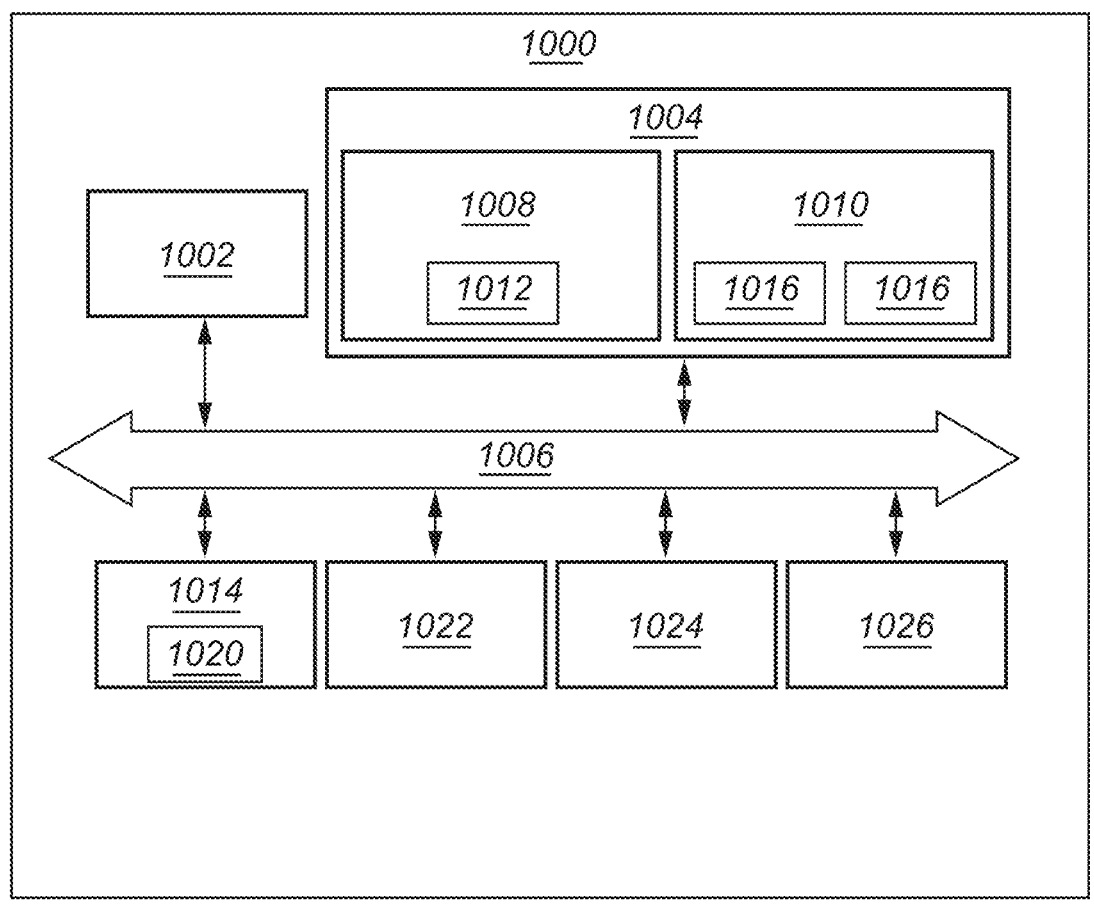
FIG. 6 is a schematic diagram of an exemplary computer system for implementing examples disclosed herein, according to an example.

FIG. 6 is a schematic diagram of a computer system 1000 for implementing examples disclosed herein, such as for implementing examples of the control circuitry 23 of the drive train arrangement 5 according to examples. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or indication processing or for executing computer code stored in memory 1004. The processing circuitry 1002 may, for example, include a general-purpose processor, an application specific processor, a Digital indication Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A drive train arrangement for a heavy duty vehicle, comprising:
    an internal combustion engine with at least one cylinder having a combustion gas inlet for receiving combustion gas, and an exhaust outlet for output of pressurized exhaust gas from the cylinder;
    an exhaust gas recirculation pump having a pump inlet coupled to the exhaust outlet of the cylinder of the internal combustion engine, and a pump outlet coupled to a vehicle air tank and to the combustion gas inlet of the cylinder of the internal combustion engine;
    a first flow control arrangement arranged to control fluid flow from the pump outlet of the exhaust gas recirculation pump to the combustion gas inlet of the cylinder of the internal combustion engine, and to the vehicle air tank; and
    control circuitry arranged and configured to control operation of the first flow control arrangement,
    wherein the control circuitry is configured to:
        acquire a first indication indicative of an air pressure in the vehicle air tank;
        control, in response to the first indication indicating that the air pressure in the vehicle air tank is below a predefined first threshold pressure, the first flow control arrangement to allow fluid flow from the pump outlet of the exhaust gas recirculation pump to the vehicle air tank;

acquire a second indication indicative of a pressure in a fluid conduit between the exhaust outlet of the cylinder of the internal combustion engine and the pump inlet; and control, in response to the second indication indicating that the pressure in the fluid conduit is higher than a predefined second threshold pressure, the exhaust gas recirculation pump to increase a gas flow rate through the exhaust gas recirculation pump.

2. The drive train arrangement of claim 1, wherein the control circuitry is configured to control, in response to the first indication indicating that the air pressure in the vehicle air tank is below the first threshold pressure, the first flow control arrangement to prevent fluid flow from the pump outlet of the exhaust gas recirculation pump to the combustion gas inlet of the cylinder of the internal combustion engine.

3. The drive train arrangement of claim 1, wherein the control circuitry is configured to control, in response to the first indication indicating that the air pressure in the vehicle air tank is below the first predefined threshold pressure, the exhaust gas recirculation pump to provide a pressure differential between the pump outlet and the pump inlet.

4. The drive train arrangement of claim 1, wherein:
the drive train arrangement comprises a second flow control arrangement arranged to control fluid flow from the exhaust outlet of the cylinder of the internal combustion engine to an exhaust after treatment system of the internal combustion engine; and
the control circuitry is configured to:
control, in response to the second indication indicating that the pressure in the fluid conduit is higher than the predefined second threshold pressure, the second flow control arrangement to increase a gas flow from the exhaust outlet of the cylinder of the internal combustion engine to the exhaust after treatment system of the internal combustion engine.

5. The drive train arrangement of claim 1, wherein:
the drive train arrangement comprises a second flow control arrangement arranged to control fluid flow from the exhaust outlet of the cylinder of the internal combustion engine to an exhaust after treatment system of the internal combustion engine; and
the control circuitry is configured to:
control, in response to the second indication indicating that the pressure in the fluid conduit is lower than a predefined fourth threshold pressure, the second flow control arrangement to reduce a gas flow from the exhaust outlet of the cylinder of the internal combustion engine to the exhaust after treatment system of the internal combustion engine.

6. The drive train arrangement of claim 1, comprising a cooling arrangement between the exhaust outlet of the cylinder of the internal combustion engine and the pump inlet.

7. The drive train arrangement of claim 1, wherein the control circuitry is configured to control the internal combustion engine to an air pumping mode in which fuel supply to the cylinder is prevented.

8. The drive train arrangement of claim 7, wherein:
the drive train arrangement comprises an electric motor controllable to rotate a crankshaft of the internal combustion engine; and
the control circuitry is configured to control the electric motor to rotate the crankshaft of the internal combustion engine in the air pumping mode.

9. A vehicle comprising:
vehicle wheels; and
the drive train arrangement of claim 1 arranged to drive at least one of the vehicle wheels.

10. The vehicle of claim 9, comprising:
the vehicle air tank coupled to the pump outlet of the exhaust gas recirculation pump; and
an air brake system coupled to the vehicle air tank and to at least one of the vehicle wheels, the air brake system being operable using compressed air from the vehicle air tank.

11. A method of providing pressurized air to a vehicle air tank of a heavy duty vehicle including an internal combustion engine with at least one cylinder having a combustion gas inlet for receiving combustion gas, and an exhaust outlet for output of pressurized exhaust gas from the cylinder, and an exhaust gas recirculation pump having a pump inlet coupled to the exhaust outlet of the cylinder of the internal combustion engine, and a pump outlet coupled to the vehicle air tank and to the combustion gas inlet of the cylinder of the internal combustion engine, the method comprising:
acquiring a first indication indicative of an air pressure in the vehicle air tank;
controlling, in response to the first indication indicating that the air pressure in the vehicle air tank is below a predefined first threshold pressure, a first flow control arrangement to allow fluid flow from the pump outlet of the exhaust gas recirculation pump to the vehicle air tank;
controlling, in response to the first indication indicating that the air pressure in the vehicle air tank is below the first threshold pressure, the exhaust gas recirculation pump to provide a pressure differential between the pump outlet and the pump inlet; and
controlling, in response to the first indication indicating that the air pressure in the vehicle air tank is below the first threshold pressure, the exhaust gas recirculation pump to operate until the pressure differential between the pump outlet and the pump inlet is increased at least 3 bar.

12. The method of claim 11, comprising:
cooling gas output through the exhaust gas outlet of the cylinder upstream of the pump inlet of the exhaust gas recirculation pump.

\* \* \* \* \*